Oct. 7, 1958 R. GUNN 2,855,598
DEVICE FOR ANTENNAS TO OVERCOME PRECIPITATION
STATIC INTERFERENCE
Filed Aug. 12, 1953
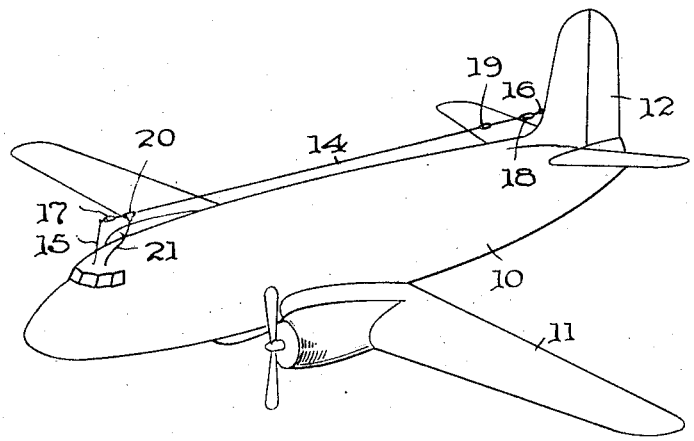
FIG. 1.
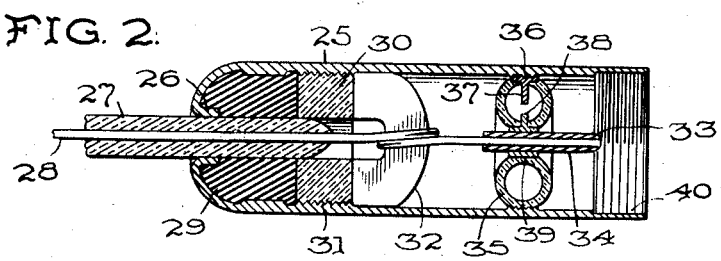
FIG. 2.
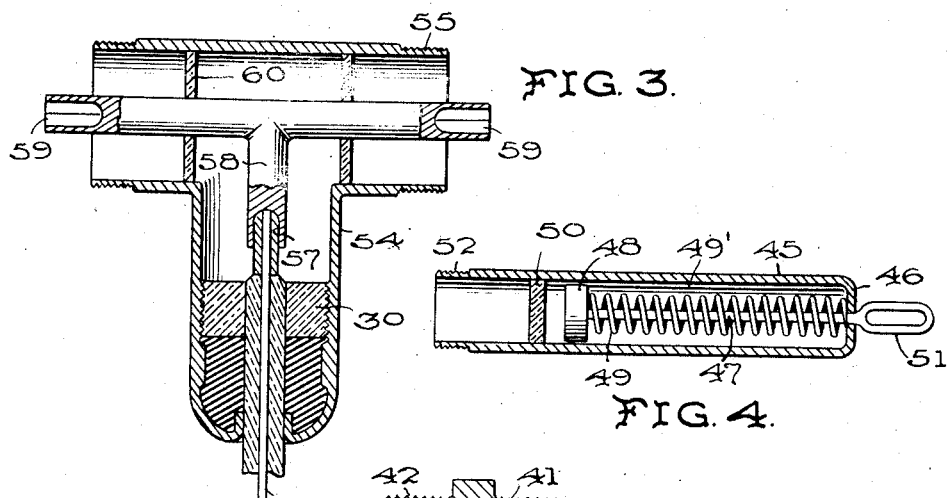
FIG. 3.
FIG. 4.
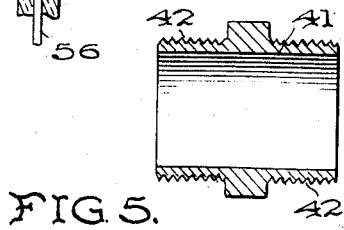
FIG. 5.
INVENTOR.
ROSS GUNN
BY
*Leech & Radue*
ATTORNEYS

United States Patent Office 2,855,598
Patented Oct. 7, 1958

2,855,598

DEVICE FOR ANTENNAS TO OVERCOME PRECIPITATION STATIC INTERFERENCE

Ross Gunn, Washington, D. C.

Application August 12, 1953, Serial No. 373,864

9 Claims. (Cl. 343—701)

This invention relates to overcoming "precipitation static" interference with radio reception as encountered on aircraft or other vehicles.

The fundamental causes and meteorological conditions responsible for the occurrence of precipitation static on aircraft have been outlined in a series of technical papers appearing in the Proceedings of the Institute of Radio Engineers in April and May, 1946. The work leading up to the publishing of these papers resulted in the establishment of interim measures for the elimination of precipitation static interference on military and civilian aircraft.

It is therefore the general object of the present invention to provide improved methods of and apparatus for the substantial elimination of precipitation static on aircraft.

Precipitation static interference with radio reception aboard aircraft has been demonstrated to be the result of corona discharge from the antenna and adjacent structures caused by high potential static charges accumulated on the metal structure of the craft. This charge results from the generation of electricity through high velocity frictional contact between the surface of the craft and intercepted particles of precipitation or dust.

In addition to the above autogenous electrification, aircraft are also subject to exogenous electrification by the charging thereof as the result of exposure to atmospheric electric fields such as produced by thunderstorms. Alone or together these may result in potentials, in respect to the air several aircraft diameters away, of hundreds of thousands of volts.

At very high potentials the charge leaks off to the air in the form of sparks or corona sometimes known as St. Elmo's Fire, the discharges usually taking place from the most exposed areas and those of small radius. The antenna wire being substantially at the potential of the fuselage of the aircraft and falling into both of these categories is particularly vulnerable to corona discharge. Careful tests have shown that the discharge of appreciably more than a microampere of direct corona current prevents the maintenance of radio communication.

One of the important objects of the present invention includes methods of and means for preventing the continuous discharge of direct current from aircraft antenna.

Corona current can be completely suppressed in aircraft antenna by covering it with a suitable insulating layer and maintaining the layer quite intact. However the requirements to be met by such insulation are critical and to date only the plastic polyethylene comes close to meeting all of the requirements.

Completely insulated antennas normally will not discharge corona current until electric fields sufficient to puncture the dielectric are encountered, and they will be essentially free of noise until that time. Presently employed polyethylene covering will withstand from 65,000 to 70,000 volts and by the use of large diameter wire this can be upped to about 75,000 to 80,000 volts practically. This is moderately good performance but occasions arise when voltages much exceeding these values are encountered and the insulation is frequently punctured. One single puncture renders the antenna no better than a bare wire. Routine testing of such antenas for continuity of dielectric is seldom practiced and some means is needed to protect the antenna from puncture under all conditions.

It is therefore another important object of the invention to provide means coextensive with or incorporated in the antenna system that will protect the antenna from puncture under the most serious conditions.

Another important object of the invention is to provide auxiliary discharge paths between the antenna wire proper and the adjacent air that becomes effective when the potential between the wire and air approaches or exceeds the dielectric strength of the insulation employed.

A further object of the invention resides in the provision of antenna fittings equipped with protecting breakdown paths adjusted to conduct at a voltage just slightly less than the normal breakdown voltage of the antenna insulation covering and independent of the altitude of the aircraft.

Other and further objects and details of the invention will be more apparent to those skilled in the art upon a consideration of the accompanying drawings and following specification, wherein are disclosed several exemplary embodiments of the invention, with the understanding that such modifications and combinations of disclosed features may be made as fall within the scope of the appended claims without departing from the spirit of the invention.

In said drawings:

Fig. 1 is a perspective view of an aircraft having an antenna equipped with fittings constructed in accordance with the present invention, at least one of which embodies the protective breakdown path from antenna wire to atmosphere;

Fig. 2 is a longitudinal central section through an antenna assembly element equipped with a breakdown path and capable of being used in the construction of various forms of complete fittings;

Fig. 3 is a view similar to Fig. 2 of a T for use in such fittings;

Fig. 4 is a view similar to Fig. 2 of a resilient tension attachment for such antenna fitting; and Fig. 5 illustrates a representative form of union for use in assembling various groups of elements into a complete fitting.

The vulnerability of the presently used aircraft antennas comprising a wire of about No. 16 B and S gauge covered with a uniform cylindrical layer of polyethylene sufficient to bring its diameter up to approximately .2 inch derives from the likelihood of puncturing the covering by the excessive potential frequently existing between the antenna and the air.

The present invention seeks to provide a safe path for the discharge when the antenna potential becomes excessive and dangerous to its insulation by making use of fittings whose exterior surface is bare metal exposed to the adjacent air. The antenna wire is carefully insulated from this metal and an auxiliary discharge path or paths is arranged between the wire proper and this exterior conducting shell of the fitting and adjusted to protect the antenna covering from puncture, with the resulting misperformance under precipitation static interference conditions. Preferably the gap is adjusted to break down, independent of the atmospheric pressure, when the potential between the wire and the adjacent air approaches the dielectric strength of the insulation employed on the antenna wire.

Referring now to the drawings, and first to Fig. 1, which is representative of a conventional aircraft, it will be seen that the metal shell 10 thereof is of irregular configuration because of the attached wings 11 and empennage 12 containing relatively sharp and exposed edges, corners and the like, from which corona discharge may take place to the surrounding air. Equally exposed, however, is the usual antenna wire 14 spanning the distance between a short mast 15 projecting up from the fuselage above the pilot's compartment and the leading edge of the vertical stabilizer fin 16. If this distance is proper for the requisite antenna length it is insulated from these two supports by suitable insulators 17 and 18. Otherwise intermediate insulators, such as 19, may be provided, or the active antenna length shortened by proper attachment of the lead-in fitting 20 from which the insulated lead-in wire 21 passes through suitable insulators in the fuselage wall to the radio equipment.

In accordance with present day practice all of these fittings and extensions of the antenna, guy wires and the like associated therewith are covered with insulating tape or plastic to suppress corona discharge from the antenna or its appurtenances from which noise signals might be coupled to the antenna.

Each of the fittings 17, 18, 19, 20 and even the mast 15, are preferably constructed in accordance with the disclosures in Figs. 2 to 5 of this application, suitably assembled in appropriate relationship for the specific purpose at the particular locale indicated.

The basic element forming a part of at least one fitting on each antenna, and more if the length is sufficiently great, is illustrated in Fig. 2 as comprising a large diameter outer shell 25, preferably a cylindrical aluminum tube having one end reentrant to provide a small opening 26 to tightly engage the walls of the insulation 27 of polyethylene or equivalent material covering the antenna conductor 28. The shape of the reentrant end provides maximum radius of curvature and minimum sharp edges for corona discharge. The conductor and its insulation extend a considerable distance into the tube, as shown, and then the conductor is bared for the remainder of its length within the tube.

A soft plastic grommet 29 surrounds the antenna wire insulation and fills the end of the shell about it. This material is highly insulating and is forced into a small volume and compressed onto the dielectric of the antenna wire to seal it from outside moisture by means of a suitably threaded plug 30, preferably of ceramic material, whose circumferential threads engage with those at 31 on the interior of the shell. The wire beyond the insulation is supported by a strain insulator in the form of bridge-like fitting 32, also of ceramic material and preferably supported from the plug 30. The wire passes around this insulator for several turns as shown and may be further held in position by suitable tie wires if desired. On leaving the bridge member 32 the wire passes longitudinally through and is soldered into the end 33 of a conventional banana plug 34 for appropriate connection to fitting elements where desired.

Surrounding the left end of the banana plug and positioning it centrally of the shell is the insulating envelope 35 appropriately secured in the shell such as by having a threaded external fitting 36 engaging with threads in the shell wall. This fitting, being metal, is connected by a sealed conductor passing through the outer wall of the envelope to an internal electrode 37 spaced an appropriate distance from a second electrode 38 connected through the inner wall of the envelope to a metal sleeve 39 engaging the exterior of the banana plug.

The device just described is a safety gap and is merely illustrative of many forms which the auxiliary discharge path may take, each capable of use in a construction such as disclosed in Fig. 1 by minor and appropriate modifications. It will be appreciated that the envelope is sealed and that the desired break-down potential is established by fixing the pressure of air or some inert gas therein. Optionally various forms of oil may be substituted for the gas so that reliance need not be placed on the pressure but rather on the selection of the material to predetermine the break-down potential.

The right end of shell 25 may be internally threaded at 40 to permit it to be connected to other elements for assembly into an antenna fitting unit.

Should it be desired to incorporate the part illustrated in Fig. 2 into a strain insulator, it may be attached by direct threading to the unit illustrated in Fig. 4.

The strain insulator portion illustrated on a smaller scale in Fig. 4 is formed from a cylindrical metal shell 45 having inturned end 46 with a central opening through which rod 47 slides. The inner end of this rod is fitted with a head 48 between which and the end 46 a compression spring 49 is compressed to form a resilient attachment intended to keep the antenna under proper tension at all times. The spring is housed in the compartment 49' separated from the remainder of the shell by a bulkhead 50. Eye 51 on the outer end of rod 47 provides for attachment to the mast or other part of the craft. The external threads 52 are for direct attachment to threads 40 on the fitting element shown in Fig. 2.

Prior to or following the assembly the whole of the space within the unit of Fig. 2 and the attached compartment of Fig. 4 is filled with an appropriate highly insulating jelly, such as one well known to the trade and referred to as D–C 4, or equivalent material, to thoroughly insulate the conducting parts from the outer shell except by way of the gap 37—38.

Where a lead-in unit or T is to be formed a component such as illustrated in Fig. 3 may be assembled between the elements shown in Figs. 2 and 4. This has an appropriate T shell 54 of conventional construction having the externally threaded ends 55. The leg of the T is adapted to receive an insulated antenna conductor 56 in the manner described in connection with the left end of Fig. 2, and here the banana plug 57 may be mounted directly on the end of the wire beyond the ceramic disc 30 to be received in a socket in the leg of the T-conductor 58 supported in the shell by insulating discs 60. In this case the conductor is shown as also having sockets 59 in the ends of its head portion for engagement, for instance, with banana plugs like 33 of the element of Fig. 2. Where the lead-in comes from the center of an antenna the need for both ends of the T conductor will be appreciated, and here the second element attached to the T will be identical to the one shown in Fig. 2 but without the safety gap portion.

Many other combinations suggest themselves and can be made with the fittings shown or slight modifications in them in order to provide all of the necessary types of units to replace those at present used with insulated antenna. One such additional fitting is shown in Fig. 5 comprising a tube 41 externally threaded at both ends. Obviously a conventional externally threaded coupling may also be provided.

In operaion the antenna wire, effectually connected to the shell of the craft at the "ground" connection of the radio apparatus, is insulated from the atmosphere whereby corona discharge from it is prevented. On occurrence of excess potential on the antenna wire breakdown occurs across the discharge gap and the high potential is dissipated to the atmosphere through the shell of the fitting of Fig. 2 just like it would discharge from a bare wire. The rounded ends of such fittings reduce the concentration of flux and help suppress corona discharge but permit discharge of excess electric charge to the atmosphere. The noise from such discharge occurs but seldom, is of short duration and normally does not seriously interfere with radio communication.

I claim:

1. A fitting for an antenna constructed of wire having a full insulating covering comprising in combination, a tubular metal shell having a reentrant end sized to closely fit the said covering, sealing means in said shell to engage said covering to moistureproof the antenna entrance to the shell, insulating means cooperating with said shell to compress said sealing means and support the bared wire, means in said shell forming a normally insulating auxiliary discharge path connected between the said wire and said shell and means closing and sealing the opposite end of said shell.

2. The antenna fitting as defined in claim 1 in which the means for closing the opposite end of said shell comprises a fitting unit coupled to the original fitting and selected from among a plurality of different purpose units comprising a lead-in tap, a terminating separator similar to the original fitting; and a spring tensioning device having a barrier between the spring and the coupling means for attaching it to the first antenna fitting.

3. The antenna fitting as defined in claim 1 in which the whole interior of the shell is filled with a highly insulating viscous material.

4. The antenna fitting assembly as defined in claim 2 in which the whole interior of the shell assembly exposed to antenna potential is filled with a highly insulating viscous material.

5. A fitting unit for an antenna construction of wire having a full insulating covering comprising a tubular shell having a conducting exterior surface, means at one end of said shell to receive said covered wire and seal the insulation thereon to the interior wall of the shell, insulating means in said shell providing a strain attachment for the bared wire of the antenna, means connected between said antenna wire and said conducting exterior surface providing a discharge path for potentials dangerous to said wire covering, said path being nonconducting to lower potentials, and means to close and seal the opposite end of said shell.

6. The fitting unit as defined in claim 5 in which the closing and sealing means comprise a tension unit having a shell adapted to be coupled to the opposite end of the first shell, a partition in said second shell and a resilient strain mechanism in the second shell beyond said partition.

7. The fitting unit as defined in claim 5 in which the means to close and seal the opposite end of the shell is a second fitting and there is provided one element of a separable electric connector secured to said wire and positioned to engage a complementary element of the connector mounted on a second fitting unit.

8. The fitting unit as defined in claim 7 in which the second fitting unit comprises a T, the shell of which has a through portion having coupling means on the ends thereof and a leg portion having antenna wire receiving and sealing means at the end thereof, and a T-shaped conductor within and spaced from the shell walls and having a complementary connector element on all ends thereof.

9. The system for protecting against puncture the fully insulating covering of a wire antenna exposed to the atmosphere and effectually connected to the metal shell of a craft whose potential achieves at times a substantially higher value than that of the surrounding atmosphere including terminating said antenna wire in means having a metal shell bare on the exterior and apertured to closely pass the wire and insulation, means to moisture-proof the entrance area between the shell aperture and insulation, means in said shell to attach the bared end of said conductor to and insulate it from the shell, a safety gap in the shell connected between the shell and wire providing a normally insulating excess voltage escape path to the shell, an aperture in said shell for contact access to said wire and means to close and seal said last mentioned aperture.

No references cited.